United States Patent

[11] 3,552,434

| [72] | Inventor | Norman H. Haenky |
| | | Tulsa, Okla. |
| [21] | Appl. No. | 817,394 |
| [22] | Filed | Apr. 18, 1969 |
| [45] | Patented | Jan. 5, 1971 |
| [73] | Assignee | FWI, Inc. |
| | | Tulsa, Okla. |
| | | a corporation of Delaware |

[54] CAMMED PLUG VALVE
13 Claims, 9 Drawing Figs.

[52] U.S. Cl.................................................. 137/556,
 251/163, 251/285, 251/286
[51] Int. Cl.......................................................F16k 37/00,
 F16k 5/14, F16k 51/00
[50] Field of Search............................................ 137/556,
 556.3; 251/163, 284—288, 317

[56] References Cited
UNITED STATES PATENTS
1,477,023  12/1923  Anderson.................... 251/285X
2,015,849  10/1935  Hardies........................ 251/163X
2,169,321   8/1939  Jones............................ 251/286X FOREIGN PATENTS
320,865   5/1957  Switzerland.................. 251/285

Primary Examiner—Henry T. Klinksiek
Attorney—Head & Johnson

ABSTRACT: The invention relates to a plug valve including a body having a fluid passageway therethrough, a cylindrical plug chamber in the passageway, and a generally cylindrical plug rotatably positioned in the chamber, the plug having an axial opening therethrough alignable with the fluid passageway in one position and transverse to the fluid passageway in the other, the plug member having a cam surface thereon engageable with the body to force the plug against the body to block fluid flow when the valve is in the closed position.

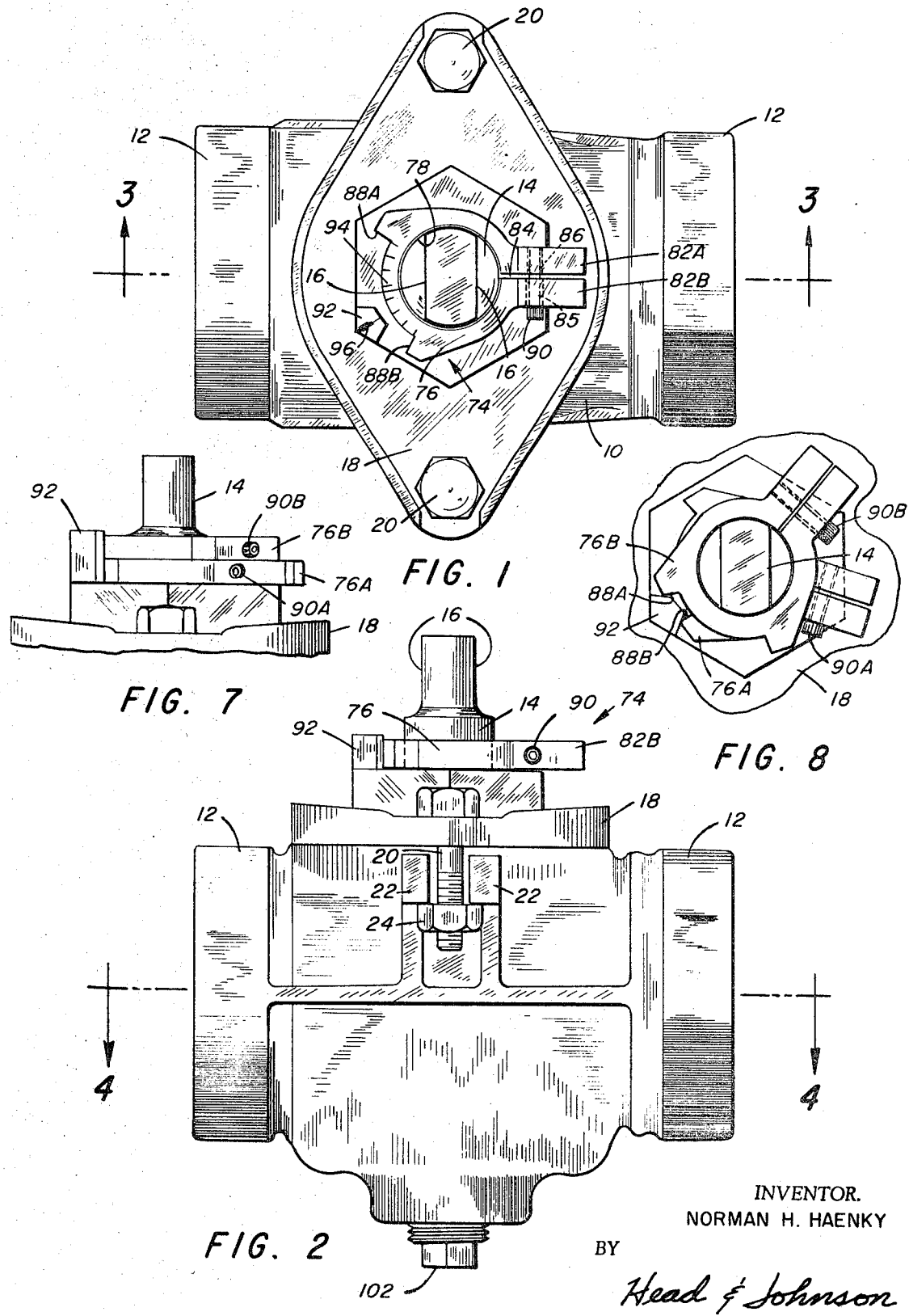

INVENTOR.
NORMAN H. HAENKY
BY
Head & Johnson
ATTORNEYS

INVENTOR.
NORMAN H. HAENKY
BY
Head & Johnson
ATTORNEYS 3,552,434

CAMMED PLUG VALVE

BACKGROUND, SUMMARY AND OBJECTS

Plug valves are well-known devices utilized by all phases of industry. This invention provides a new type of plug valve distinguishable by the arrangement of the means for insuring complete sealed closure of the valve passageway when the valve is in closed position.

The valve is characterized by its relative simplicity and yet highly effective closure against fluid flow when the valve is in the closed position. A unique characteristic of the valve is a provision of means wherein direct force applied by cam-engaging surfaces operate within the valve to close a sealing surface against the valve body to effect complete leakproof closure of the valve. These features and characteristics are obtained by the configuration of the components making up the valve, particularly the configuration of the plug chamber and the plug member.

It is therefore an object of this invention to provide an improved plug valve. More particularly, an object of this invention is to provide an improved plug valve having a plug member rotatable in a plug cylinder in a valve body including cam means for forcing the plug into contact with the valve body to effect sealing when the valve is in the closed position.

Another object of this invention is to provide a plug valve of a relatively simple configuration yet a valve which provides effective positive and directly applied closing force to close a plug member against the valve body to effect leakproof sealing when the valve is in closed position.

Another object of this invention is to provide a valve body having a substantially cylindrical plug chamber therein and a plug member of compatible configuration such that in the opened position the plug is freely rotatable in the valve body but as the plug is rotated towards the closed position cam surfaces engage to positively force the plug member into contact with the valve body to effect a positive closure of the valve.

Another object of this invention is to provide a plug valve including a seat member contained in the valve body against which a plug is positively forced as the plug is rotated to the closed position, the seat member being characterized by the provision of both a resilient and metal to metal seal when the valve is in the closed position.

Another object of this invention is to provide a valve having a plug rotatable in a chamber in the valve body, the plug having a downwardly extending trunnion of semicircular cross-sectional configuration which serves to guide the plug as it is rotated between opened and closed positions but to permit free lateral displacement of the plug as it is forced into positive seating engagement as the plug is rotated to the closed position.

Another object of this invention is to provide a memory-stopping element for mounting on the stem of a valve, the element being readily positionable to stop the valve at predetermined positions as desired.

DESCRIPTION OF THE VIEWS

FIG. 1 is a top view of an embodiment of the plug valve of this invention.

FIG. 2 is a side elevational view of the valve illustrated in FIG. 1.

FIG. 7 is a partial elevational view of the upper portion of the valve showing the use of tandem locking elements utilized to lock the valve plug in a preselected position.

FIG. 8 is a partial top view showing the utilization of tandem locking elements as in FIG. 7.

DETAILED DESCRIPTION

Figure 3:
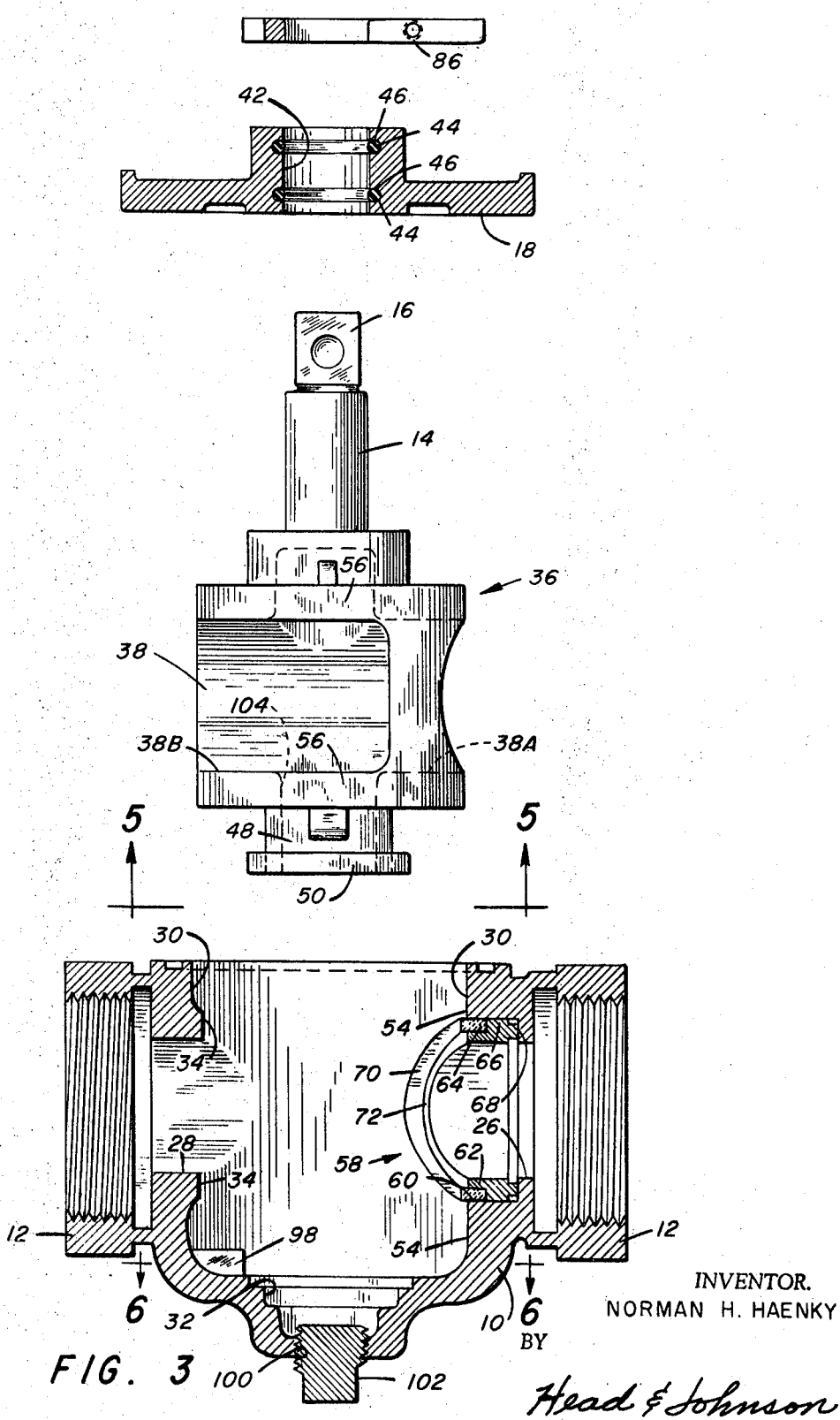
FIG. 3 is an exploded cross-sectional view taken along the line 3-3 of FIG. 1.

Referring to the drawings and first to FIGS. 1 and 2, the external appearance of a valve embodying the principles of this invention is illustrated, it being understood that the invention is not limited to such exemplified embodiment. The valve includes a body 10 having a threaded pipe receiving portion 12 at each end. The valve body 10 may likewise be equipped with end flanges or with ends designed for welding, and so forth, without departing from the invention.

Extending upwardly from the body is a valve stem 14 which includes wrench flats 16 by which the stem may be rotated. The top of the valve body is closed by a cover member 18 held to the valve body by means of bolts 20. Extending from body 10, as shown in FIG. 2, are lugs 22 which receive the bolts 20. A nut 24 contacts the lower surfaces of lugs 22 to hold the cover member 18 securely to the valve body.

Referring to FIG. 3 the details of the valve are better seen. The valve body 10 has a fluid passageway therethrough defined by fluid inlet opening 26 and a fluid outlet opening 28. Intersecting the fluid passageway is a generally cylindrical plug chamber 30 having the cylindrical axis thereof perpendicular the fluid passageway. The plug chamber 30 extends from adjacent the bottom of the valve and forms an opening in the top of the valve body.

The valve body 10 includes a reduced diameter cylindrical trunnion recess 32 in the lower portion thereof, the axis thereof being coincident with the cylindrical axis of the plug chamber 30.

The generally cylindrical plug chamber 30 is further defined by a portion surrounding the fluid outlet passageway 28 which forms a cam-engaging surface 34. The distance from the axis of the plug chamber 30 to the cam engaging surface 34 is less than the distance to any other portion of the plug chamber.

Figure 4:
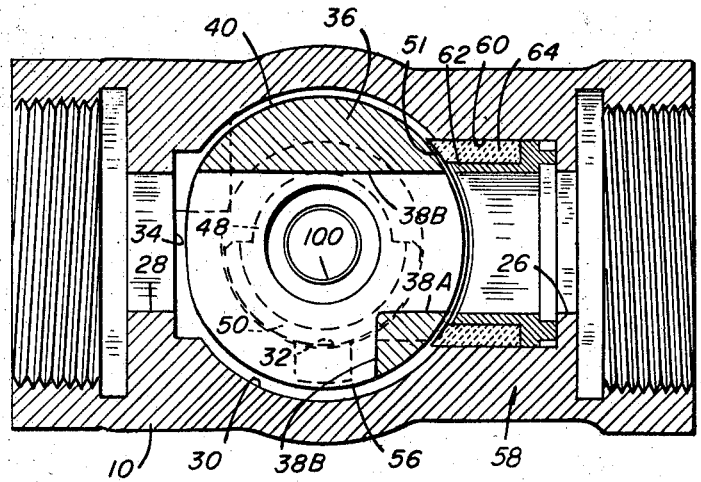
FIG. 4 is a cross-sectional view taken along the line 4-4 of FIG. 2 showing the valve in open position.

Rotatably received in plug chamber 30 is a generally cylindrical plug member 36 which is rotatable between an opened and a closed position. The plug member 36 includes a fluid passageway opening 38 therethrough which, when the valve is in the opened position as shown in FIG. 4, aligns with the fluid passageway in the valve body defined by fluid inlet 26 and fluid outlet 28. Formed on the generally cylindrical peripheral surface of plug member 38 is a sealing surface 40.

Referring again to FIG. 3, extending upwardly from and coaxially with the plug member 36 is valve stem 14 which, in the preferred embodiment, is integral with the plug member. Cover member 18 has an opening 42 therein sealably receiving stem member 14. In the illustrated arrangement opening 42 includes two spaced apart O-rings 44 seated in grooves 46 sealably engaging stem 14 to prevent leakage of fluid from the interior of the valve along the stem. The provision of O-rings is merely exemplary of various types of sealing or packing arrangements which may be provided for sealing stem 14 while at the same time permitting rotation of the stem as the plug is moved from one operating position to another.

Figure 5:
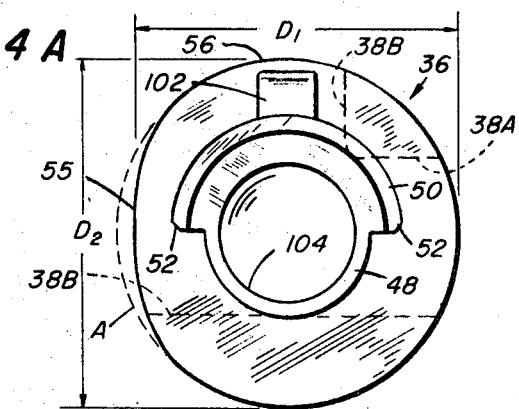
FIG. 5 is a bottom view of the plug member of this invention taken along the line 5-5 of FIG. 3, showing the configuration of the plug trunnion.

Downwardly extending from plug member 36 is integral trunnion 48. The trunnion is rotatably received in the body trunnion receiving recess 32. As best shown in FIG. 5, trunnion 48 has an enlarged diameter semicircular portion 50. The axis of the enlarged semicircular portion 50 is coincident with the axis of the generally cylindrical plug member 36 and the stem member 14. The radius of the semicircular portion 50 is slightly less than that of body trunnion recess 32 permitting the semicircular portion of trunnion 48 to freely rotate therein. The semicircular trunnion portion 50 is opposite the plug member sealing surface 40 and is provided with recessed edges 52.

As best seen in FIG. 5, the plug member 36 has a diameter $D_1$ measured in a plane perpendicular the cylindrical axis and in the plane of the fluid passageway 18 which is less than a diameter $D_2$ measured in a plane perpendicular the cylindrical axis and in the plane of the fluid passageway.

OPERATION

Figure 4A:
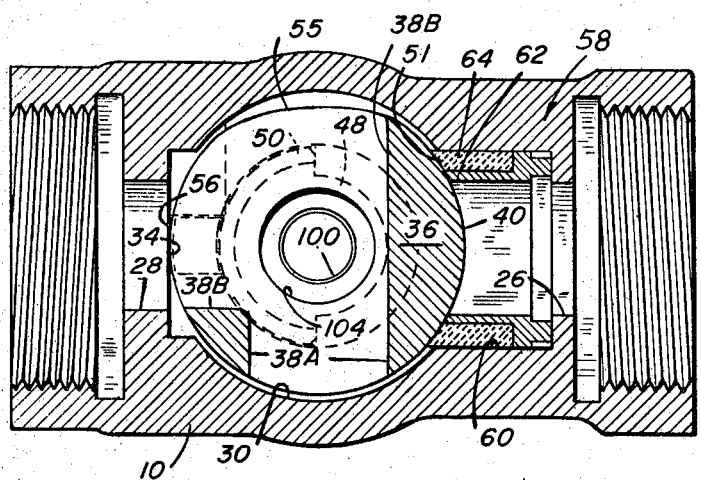
FIG. 4A is a cross-sectional view as in FIG. 4 but showing the valve in closed position.

Operation of the valve is best understood by referring to FIGS. 4 and 4A. In FIG. 4 the valve is shown in the opened position and it can be seen that the fluid passageway 38 in plug member 36 is aligned by the passageway formed by inlet opening 26 and outlet opening 28 in the valve body permitting the free uninterrupted flow of fluid through the valve. It is noted in this position that the peripheral surface of the plug member 36 is not in contact with any portion of the plug chamber 30. The semicircular portion 50 of the trunnion 48 functions as a guide for the rotation of the plug. This freedom of contact means that the valve can be moved towards the closed position without necessity of overcoming friction, and further, without wear on seating surfaces.

When it is desired to close the valve the plug 36 is rotated towards the closed position shown in FIG. 4A. In this position the plug-sealing surface 40 in in positive contact with the sealing surface 51 surrounding the fluid inlet opening 26. This positive contact is achieved since the plug chamber diameter measured between the sealing surface 51 and the cam-engaging surface 34 is slightly less than the plug diameter between the sealing surface 40 and the opposite plug cam surface 56. Thus, in the closed position, a positive seal of the plug against the seating surface 51 surrounding the inlet opening 26 is attained.

The provision of the plug cam surface 48 may be obtained in a variety of ways. In the arrangement as illustrated in FIGS. 4A and 4B the plug is substantially cylindrical with the area 55 intermediate the sealing surface 40 and plug cam surface 56 being slightly relieved. This is shown in FIG. 5 by the dotted line A depicting the extension of the cylindrical peripheral surface of the plug. In manufacturing the plug it can be formed substantially cylindrical with the peripheral area 55 thereof slightly ground away to provide the clearance necessary when the plug is in the opened position. In another arrangement the plug 36 may be cylindrical except that the areas forming the plug cam surface 56 may be of increased diameter.

It can be seen that the closing force applied to move the plug-sealing surface 40 into positive contact with the body seating surface 51 is direct. That is, such pressure is not applied by way of stem 14 and trunnion 48 but such pressure is applied directly through the plug 36. Thus no tendency exists to warp or deform any portion of the plug as is true in other types of valve-closing means which apply pressure to stem portions.

Attention is particularly called to the action of the semicircular portion 50 of trunnion 48 in trunnion recess 32. It can be seen that when the valve is in the closed position the semicircular portion 50 permits the slight shifting of the plug 36 towards the body-sealing surface 54 to obtain positive sealing of the valve, and no force whatsoever is applied to trunnion 56. The resilient seal formed by means of O-rings 44 surrounding stem 14 permits the slight movement of the stem necessary to obtain positive closure of the valve without permitting leakage of the fluid along the stem.

ALTERNATE EMBODIMENTS

An improved embodiment of the invention includes the utilization of an improved sealing member, generally indicated by the numeral 58 (FIGS. 3, 4 and 4A). The body inlet includes an enlarged diameter seal-receiving recess 60 in the form of an annular recess about passageway 26. The seal assembly 58 is cylindrical, having an outer diameter approximately that of seat-receiving recess 60 and an inner diameter equal to the diameter of the inlet passageway 26 to form a continuation of that passageway. Seal assembly 58 is composed of an annular metal insert 62 and an annular deformable seal portion 64. The metal insert 62 has a base section 66 having an outer diameter approximately that of the seal-receiving recess 60, and an inner diameter equal to that of the fluid inlet 26. The annular resilient or deformable portion 64 of the seat is received about the exterior of the annular metal insert 62 and forward of the enlarged diameter section 66. The rearward surface 68 of the metal insert 62 engages valve body 10. In the illustrated arrangement the metal insert 62 is of reduced internal and external diameter adjacent the base 68 to increase the pressure per square inch of the base against the body 10 when the valve is in the closed position and thereby increase the sealing effectiveness of the metal insert against the body.

The resilient seal 64 is of a thickness such that it is in contact with the seal recess 60 along its outer diameter and with the metal insert 62 along its inner diameter. The edges of the metal insert 62 and the deformable seal 64 adjacent the plug member 36 are concave, the arch of curvature being struck from the rotational center of the plug 36. The arcuate edge of the annular deformable seal portion 64 forms the seating surface 51 and projects slightly beyond the matching arcuate edge 72 of the annular metal insert 62 to allow for compression of the deformable portion by the plug as the plug is forced into contact with the seating element. Both the arcuate edge 72 of the metal insert and the arcuate edge 51 of the deformable portion of the seat project beyond the body plug chamber so as to be contacted by the plug-sealing surface 40 as the plug is rotated into closed position. This assures a positive resilient seal against the plug as the plug is rotated in position. As increased closing force is applied by the further rotation of the plug, a metal to metal contact is obtained between the annular metal insert 62 and the seating surface 40 of the plug.

In addition, it can be seen that in the arrangement wherein the sealing faces 51 and 72 of the seal member 58 protrude beyond plug chamber 30 increased clearance is attained between the plug member 36 and the plug chamber 30 when the valve is in the opened position. Stating it another way, by the provision of a seal insert 58 that extends beyond the internal surface of the cylindrical plug chamber 30, positive sealed closure of the valve in the closed position is obtained with less chance for frictional engagement of the plug member 36 with the plug chamber 30.

An additional alternate embodiment of this invention includes the provision of a rotational control means best shown in FIGS. 1 and 2. The control means, generally indicated by the numeral 74, includes a flat circular-locking element 76 having a central opening 78 therein. The element 76 snugly receives the valve stem 14 exteriorly of the valve plate 18. The element 76 is split at 84 and has a pair of parallel, substantially radial, leg portions 82A and 82B, one of the leg portions extending to each side of the split. Leg portion 82B has an opening 85 in the plane of the circular element 76 and perpendicular the leg portion, and the other leg portion 82A has a threaded opening 86 in axial alignment with opening 85.

The circular element 76 has spaced apart radially extending stops 88A and 88B on the outer peripheral surface. A bolt 90 extends through opening 85 in leg 82B and is threadably received in opening 86 in leg 82. When bolt 90 is loosened the control means 74 may be rotated upon stem 14 to any desired position. When bolt 90 is tightened the control means is securely locked to the stem and rotates with it.

Extending upwardly from the cover member 18 is a stop element 92 which may be integral with the cover element or removable, such as a bolt threaded into an opening in the cover element. The stop element 92 is adjacent to the peripheral surface of locking element 76 and between stops 88A and 88B. With the control means 74 securely locked to stem 14 the degree of rotation of stem is controlled by the limits established by stops 88A and 88B engaging the stop element 92. Thus, if it is desired to stop the valve in a partially opened position such as when the valve is used for throttling purposes, the control member 74 is set by first loosening bolt 90 and rotating the stem to the desired position. The control means 74 is then rotated on the stem until stop 88B engages the stop element 92. The bolt 90 is then tightened. The valve stem may be rotated to fully open the valve but when the valve is rotated towards the closed position the stem 14 will always be stopped at the same spot. The same procedure may be used to permit full closing of the valve with the control means 74 set so that when the valve is rotated towards the opened position stop 88A engages stop element 92 so that the valve can be opened only the preselected amount.

As an additional feature, the locking element 76 is provided with spaced indicating marks 94 adjacent the periphery between stops 88A and 88B. These are opposed to a mark 96 on a stop boss 92. The indicating marks 94, which may be numbered if desired, provide a means of indicating to the user the relative position of the plug in the valve so that the user can set the valve at desired throttling position.

Figure 6:
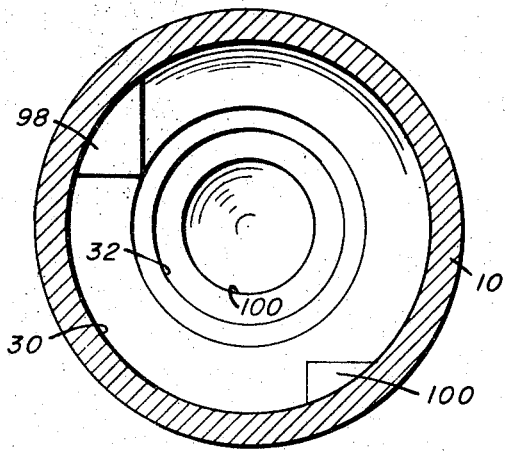
FIG. 6 is a cross-sectional view taken along the line 6-6 of FIG. 3 showing the trunnion-receiving recess of the lower portion of the valve body.

Formed as a portion of valve body 10 (see FIGS. 3 and 6) are limit bosses 98 and 100. Integrally formed as a part of plug member 36 (see FIG. 5) is limit boss 102 which extends. When the plug member 36 is positioned in plug chamber 30, between limit bosses 98 and 100. The plug thus cannot be rotated past the full opened position nor the full closed position. The control means 74 affixed to the valve stem provides means externally of the valve enabling the operator to select stop positions less than the full opened or full closed position.

FIGS. 7 and 8 show an arrangement utilizing two locking elements 76A and 76B stacked in tandem, one on top of the other, on stem 14. Stop element 92 is of a height equal to the two stop elements. By use of two locking elements the valve plug may be locked in any preselected position. To reset the position of the valve plug bolts 90A and 90B are loosened, enabling the stem to be rotated to a new position or to be opened or closed if desired. The locking elements 76A and 76B are then set so that one locking element engages one side of the stop member 92 and the other locking element engages the other side of the stop member. Bolts 90A and 90B are then tightened to secure the valve plug in the newly selected position.

An important feature of this invention is that a valve is provided having low opening and closing torques while nevertheless the valve is highly tolerant of foreign matter and abrasives. The semicircular trunnion portion 50 keeps the surface of the plug member 36 urged towards the resilient seal portion 64 at all times. The resilient seal 64 protrudes slightly beyond the closed position of the plug member circumferential surface. If desired, the resilient seal may be arranged to protrude sufficiently to engage the circumference of the plug member at all times. This allows the semicircular trunnion portion 50 and upper stem 14 to hold the plug member 36 against the resilient seat portion 64 at all times thus creating a wiping effect. This wiping action of the resilient seal portion 64 against the plug keeps foreign matter from lodging between the plug circumference and the resilient seat.

Another important feature of the valve is the extra amount of clearance between the circumference of the plug member and the body plug cavity 30 compared with other valve designs. It has been learned that the greater this clearance is the greater will be the swirling action of fluid between the plug and valve body as fluid flows through the valve. This tends to keep the valve flushed clean. The closer the tolerance between the plug circumference and the valve cavity the greater the chance of foreign particles collecting between the plug and the body. In addition, the extra clearance provided by the valve of this invention diminishes the chance of corrosion build up between the plug and the valve body.

In the preferred embodiment of the invention as shown in the drawings, and especially in FIGS. 3, 4 and 4A, the fluid passageway 38 in plug member 36 in uniquely arranged. The fluid passageway 38 may be said to be of two portions, The first portion 38A extends through the portion of plug member 36 having sealing surface 40 as a part thereof. The fluid passageway portion 38A is preferably circular in cross section and of a diameter equal to or less than the internal diameter of seat metal insert 62. The second portion 38B of the fluid passageway is of a height as measured in a plane of the plug member axis substantially equal to the diameter of body fluid outlet passageway 28. Measured in a plane perpendicular the plug axis the fluid passageway portion 38B is of a width of more than 90° of the plug member peripheral surface. This configuration means that communication between fluid passageway portion 38B is constantly provided with body fluid outlet passageway 28 when the plug member 36 is in the opened, closed and all intermediate positions.

This arrangement of the configuration of the fluid passageway in plug member 36 has several advantages. First, the downstream end of the valve is open at all times. This eliminates any chance of foreign matter collecting or being trapped inside the valve. Ice or abrasive material can freely pass out of the valve at all times. Second, a corrosion coupon may be inserted into the valve and will not be interferred with as the plug is rotated between opened and closed positions.

Another preferred embodiment of the valve of this invention includes the provision of an outlet opening 100 in the bottom of valve body 10. Opening 100 is preferably coaxial with trunnion receiving recess 32 and may be threaded as shown. When not in use opening 32 may be closed such as by means of externally threaded plug 102. Downwardly extending trunnion 48, integral with plug member 36, is preferably tubular, providing an interior bore 104 which communicates with fluid passageway 38 in the plug member.

The provision of outlet opening 100 having communication with the fluid passageway through the valve body offers many advantages. It enables the user to close a line stream off when the valve is in a downstream position and thus allows the valve to perform as a bypass valve or allows the user to flush or drain the line. This provision also adapts the valve to hot tapping service. By installing the seal end of the valve against a live producing line the user is able to run a tapping machine through the valve and after the tapping work is performed he can close the valve against the upstream pressure. By removing plug 102 from the bottom of the valve he can flush the valve body cavity clean. The user can then make his downstream connection and after doing so he can open the valve and thus be in production through the new line. With the unique flow passageway construction of the valve plug as previously discussed communication is always available between opening 100 and the body outlet opening 28 whether the plug is in the opened or closed position.

While the invention has been described with a certain degree of particularity it is manifest that many changes may be made in the details of construction and the arrangement of components without departing from the spirit and scope of this disclosure.

I claim:
1. A cammed plug valve comprising:
 a valve body having a fluid inlet passageway and a fluid outlet passageway therethrough communicating with a generally circular plug chamber, the plug chamber extending from and forming an opening in the top of the valve body and terminating adjacent the closed bottom of the valve body, the valve body including a reduced diameter circular trunnion recess in the lower portion thereof, the valve body including in said plug chamber a portion providing a body cam-engaging surface diametrically opposed to said fluid inlet, and a member surrounding said fluid inlet passageway forming a body seating-surface in said plug chamber;
 a generally cylindrical plug member rotatably received in the body plug chamber, the plug member being rotatable between an opened and a closed position, one portion of the plug member cylindrical surface serving as a plug-sealing surface, the plug member having a fluid passageway opening therethrough perpendicular the cylindrical axis and spaced from the said plug sealing surface, the plug member including an upwardly extending reduced diameter stem and a downwardly extending trunnion rotatably received in said trunnion recess in said body, said trunnion and said stem being coaxial, said plug member having a diameter measured in a plane perpendicular the cylindrical axis and in the plane of the fluid passageway therethrough less than the diameter measured in a plane perpendicular the cylindrical axis and perpendicular the plane of the fluid passageway therethrough, the last-mentioned diameter being such that the surface of the plug member opposite the sealing surface contacts said body cam-engaging surface and forces said plug-sealing surface into sealing engagement with said body-seating surface as said plug member is rotated to the closed position, the force closing said seating surface being applied by said plug member engaging said valve body and without exerting lateral force on said stem and trunnion; and a cover member sealably closing the upper end of said plug chamber, said cover member having an opening therein sealably and rotatably receiving said plug stem, a portion of which plug stem extends externally of the cover member providing means of rotating said plug member.

2. A valve according to claim 1 wherein said inlet passageway is partially defined by an enlarged diameter portion communicating with said plug chamber, and including a tubular seal member received in said enlarged diameter portion of said inlet passageway, said seal member projecting slightly into said plug chamber and providing a concaved configured sealing surface slightly engaging said plug-sealing surface when said plug is rotated to the closed position.

3. A valve according to claim 2 wherein said tubular seal member includes:

an inner annular insert of nondeformable material forming a continuation of said inlet passageway; and an outer annular seal of deformable material surrounding said inner insert and projecting slightly beyond said inner insert into the plug chamber, both said inner and outer inserts having concave faces for sealing engagement with said plug-sealing surface when said plug is in the closed position.

4. A valve according to claim 1 wherein said downwardly extending trunnion is defined in a plane perpendicular the axis thereof by a semicircular cross-sectional configuration, the radius of the semicircular peripheral surface being slightly less than the radius of said valve body trunnion recess, said semicircular peripheral surface being on the side of said plug member opposite said plug-sealing surface.

5. A valve according to claim 4 wherein said plug member trunnion is further defined, in a cross section perpendicular the plug member axis by rounded edges at each end of the semicircular peripheral surface.

6. A valve according to claim 1 wherein said downwardly extending trunnion is tubular, the interior thereof communicating with said fluid passageway in said plug member and wherein said body includes a fluid bypass opening in the bottom thereof coaxial with said trunnion recess.

7. A valve according to claim 6 wherein said fluid bypass opening is threaded and including a removable externally thread plug member received in said fluid bypass opening.

8. A valve according to claim 1 wherein said fluid passageway opening in said plug member includes an inlet portion and an outlet portion, said inlet portion communicating with said plug-sealing surface, and when said plug member is in the closed position with said body member fluid inlet passageway, the outlet portion of said plug member fluid passageway having a width, measured in a plane perpendicular the plug member rotational axis, of at least 90° of the plug member cylindrical surface whereby the outlet portion of said plug member fluid passageway is at all times in communication with said body fluid outlet passageway.

9. A valve according to claim 8 wherein said downwardly extending trunnion is tubular, the interior thereof communicating with said fluid passageway in said plug member and wherein said body includes a fluid bypass opening in the bottom thereof coaxial with said trunnion recess, said bypass opening thereby having, at all times, fluid communication with said body outlet passageway.

10. A valve according to claim 1 including a position control means comprising:

a stop element extending from the outer surface of said valve cover member, said stop member being generally parallel to and spaced from said stem;

a flat, circular locking element having a central opening snugly receiving said valve stem exteriorly of said plate member, said elements being split and having a pair of paralleled, substantially radial leg portions, one of said leg portions extending to each side of said split, one of said leg portions having an opening therein in the plane of said circular element and perpendicular the leg portion and the other leg portion having a threaded opening therein in axial alignment with said first mentioned opening, the circular element having a reduced radius portion partially defining the periphery, said reduced radius portion receiving said stop element; and a bolt received in said openings in said leg portions causing said locking element, when said bolt is tightened, to grip said stem, the boundaries of said reduced radius peripheral portion serving to limit the rotation of said stem as said boundaries engage said stop element.

11. A valve according to claim 10 wherein said locking element has spaced indicating marks on the upper surface adjacent the periphery of said reduced radius portion, said indicating marks serving to indicate, relative to said stop element, the rotational position of said stem.

12. For use with a valve having a rotatable stem extending through a valve cover member, a rotational control means comprising:

a stop element extending from the outer surface of said valve cover member, said stop member being generally parallel to and spaced from said stem;

a flat, circular locking element having a central opening snugly receiving said valve stem exteriorly of said plate member, said elements being split and having a pair of paralleled, substantially radial leg portion, one of said leg portions extending to each side of said split, one of said leg portions having an opening therein in the plane of said circular element and perpendicular to the leg portion and the other leg portion having a threaded opening therein in axial alignment with said first mentioned opening, the circular element having a reduced radius portion partially defining the periphery, said reduced radius portion receiving said stop element; and a bolt received in said openings in said leg portions causing said locking element, when said bolt is tightened, to grip said stem, the boundaries of said reduced radius peripheral portion serving to limit the rotation of said stem as said boundaries engaged said stop elements.

13. A rotational control means according to claim 12 wherein said locking element has spaced indicating marks on the upper surface adjacent the periphery of said reduced radius portion, said indicating marks serving to indicate, relative to said stop element, the rotational position of said stem.